United States Patent Office 3,689,393
Patented Sept. 5, 1972

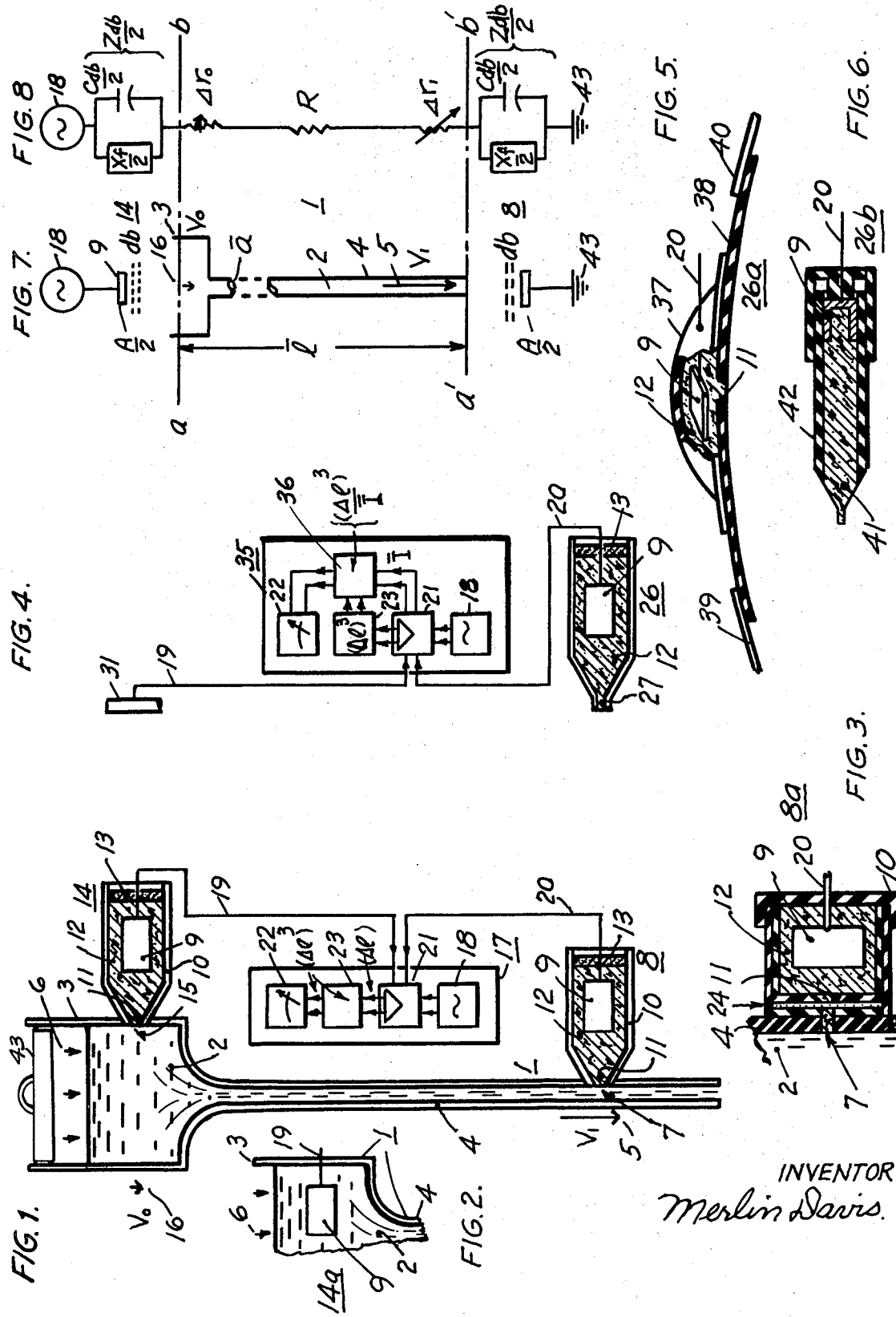

3,689,393
BLOOD DIAGNOSTIC INSTRUMENTS
Merlin Davis, 105 Columbia Ave., Pitman, N.J. 08071
Filed Oct. 20, 1969, Ser. No. 867,561
Int. Cl. A61b 51/02
U.S. Cl. 204—195 B
5 Claims

ABSTRACT OF THE DISCLOSURE

A diagnostic instrument intended primarily for the evaluation of velocity-related abnormalities in blood. These conditions are determined by sensing the inherent tendency of blood red cells to modulate the amplitude of an electric current at a distance from the electrodes. Resulting variations in electrical impedance follow an invariable cube-root function of corpuscle velocity. Electrode configuration and placement are essential factors. The electrodes employed are specially adapted for the measurement of velocity in very small vessels or hollow tubes. Remote sensing, without penetration of the vessel, is effected by means of ionic-coupling to the electrolytic mixture through membraneous materials impervious to blood.

---

The present invention relates, in general, to diagnostic instruments capable of measuring physical manifestation which are responsive to the movement of erythrocytes, or blood red cells in the presence of an electric current. The response from their transducer conforms consistently to a simple law relating to the velocity of the erythrocytes. The degree of response, or sensitivity, depends, in addition to the carrier current strength, upon their number, age, oxygen transport and other related parameters, whether suspended naturally in the plasma of whole blood or in some other compatible electrolyte.

The present invention is an outgrowth of an investigation described in National Bureau of Standards Technical News Bulletin of March 1966, p. 38, entitled, "Blood-flow Sensor." The rate of flow was reported as related to electrical conductivity. Tests were conducted in blood vessels which were large enough to insert a catheter. The catheter had a solid electrode mounted near the tip. The other electrode was placed on the subject's skin. A limit, however, has been found to the size of vessel applicable to this procedure. Electrodes of the limited area required for the smaller vessels fail to provide a flow-response signal. The present invention makes possible the sensing of blood-flow rate in small flow tubes as well as those of larger size. In addition, it permits this to be done without entering the vessel. Use with small flow-tubes also makes possible the construction of a diagnostic instrument for evaluating blood flow irregularities and the vitality of blood red-cells per se with conveniently small blood specimens.

To carry out the principles of this invention certain prescribed physical conditions must be met in order to provide a requisite low-current density at the electrodes and a maximum interelectrode electrical impedance. These factors depend upon the size, kind and placement of these electrodes which carry the electrical current to and from a given electrolyte. This electrolyte must, however, contain moving erythrocytes to be effective.

In addition to the foregoing prerequisites some electronic processing of the raw signal modulations emanating from one of the electrodes which forms the sensing probe, is necessary in order to present the output in a useful form. For example, since the law governing the response follows a cube-root function relative to the velocity of the erythrocytes, a unit may be added for cubing the detected amplitude modulations from the transducing probe. This would serve to linearize the final output and eliminate the need for use of a non-linear meter scale. In so doing an output is obtainable which is directly proportional to the velocity of the erythrocytes flowing through a given blood vessel. Furthermore, if in addition, a normalization circuit is added, then comparative velocity measurements may be made between blood vessels and a specific or absolute velocity output signal, which is independent of the average carrier current, may be obtained if desired. The output signal would then equal to $(\Delta e)^3/\bar{I}$ where $(\Delta e)^3$ equals the cubed amplitude modulation, as detected, which is proportional to the velocity and $\bar{I}$ equals the average detected carrier current. This can be done by injection of a feed-back signal proportional to the average current passing through the transducer to a normalizing divider unit ahead of the recorder or other utilization circuit, somewhat in the manner of automatic-volume-control circuits employed in the electronic art. The addition of the normalizing circuit is helpful in vivo measurements in different locations where absolute velocities are required and occlusion is to be avoided for zero-flow adjustment. For some in vitro applications flow-rate measurement is not the primary objective. For example, if the flow of the red cells is maintained constant at some given velocity an electrical output is obtainable which is proportional to the several parameters relating to the well-being of the erythrocytes, since they alone produce the primary flow-related response described. By passing measured volumes of centrifuged red cells immersed in saline through a flow-tube equipped with electrodes to be described, an index relating to red cell population is obtained.

Other more specific objectives include:

For in vivo applications:

(a) Use in research concerning the extent of pulsations in arteries as they approach the proportions of arterioles. Research in this direction has been limited in the past by the available size of hollow-tube hypodermic needles and the ability to puncture such small vessels to obtain pressure variation indications.

(b) Detection or measurement of blood flow in the eyes, pulp of the teeth, etc.

(c) Determination of impairment to circulation, such as exists in frost-bite areas of the skin and around tumerous growths as compared with like areas in another similar portion of the body.

(d) External monitoring of the amount of gas absorbed by the blood, as in deep-sea diving operations.

For in vitro evaluations:

(a) Comparisons between normal and pathologic blood at constant flow velocity, i.e., an acitivity index for the blood.

(b) Rapid sedimentation rate measurements.

(c) Blood red-cell population counting index using a measured volume of cells in physiological normal saline.

(d) Study of the sluggishness of some red cells and their propensity to stagnate in the smaller vessels, such as the coronary arteries. For this purpose the diagnostic apparatus of FIG. 1 would be used and comparisons made between measured flow rates in different bore sized flow tubes while maintaining equal $(\bar{I}/\bar{a})$ ratios (see later discussion) and equal pumping pressures. (It should be mentioned here that modulations obtained in this system are not affected, at the amplification employed, by static pressure applied to electrolytes mixtures with blood red cells.)

(e) Gradual hemolysis of erythrocytes. This is possible because only intact living blood-red cells are responsible for the flow-rate modulation effect.

(f) Blood flow measurements in vitro, under controlled conditions, as an indirect method for the determination of changes in blood rheology due to causes other than red-cell impairment.

Still other advantages will become apparent upon reference to the specifications and drawings, in which FIGS. 1 to 8 are diagramatic illustrations in simplified form in which FIG. 1 illustrates an in vitro, or clinical laboratory application of the invention for diagnostic use in testing small blood specimens for various pathologic conditions. FIG. 2 is a fragmentary illustration of an alternative construction of a passive or reference electrode unit shown as 14 in the upper portion of FIG. 1. FIG. 3 is an enlarged alternative cross sectional illustration of the working or sensing electrode unit shown as 8 in the lower portion of FIG. 1. FIG. 4 illustrates an instrument for use with living subjects or in vivo application of the invention for detecting and measuring the blood-flow rate by external contact with the vessel or skin over it, especially adapted for use with very small vessels. FIGS. 5 and 6 illustrate alternative constructions for the active working or sensing electrode unit 26 shown in the lower portion of FIG. 4. FIGS. 7 and 8 are included to show the principles involved and to illustrate the necessity for considering specific relative dimensions between the various elements involved. This is not entirely obvious from the structural form alone, shown in the previous illustrations mentioned. FIG. 7 shows the skeletonized structure of the invention from the standpoint of established theory for comparison with the applicable equivalent electrical circuit shown in FIG. 8.

FIG. 1 is an illustration in simplified form of the present invention as adapted for in vitro, or clinical laboratory diagnostic applications. It combines a fluid transport system 1 constructed from some electrical insulating material, preferably of some chemically inert plastic composition with blood red-cell compatibility, including a fluid mixture in the form of an emulsion, including an electrolyte 2. This may be a small specimen of whole blood obtained directly from a patient or it may be in the form of a fluid mixture made up as an emulsion of erythrocytes, or blood red-cells in some compatible electrolyte, such as psychological normal-saline. This fluid transport system 1 is provided with a reservoir or containing means 3 which acts as a source of supply of the electrolyte mixture 2. The fluid transport system 1 has a passageway opening from the containing means 3 in the form of a small bore tube 4 through which the electrolyte mixture 2 is forced to flow at controlled predetermined volocities as $V_1$, indicated by the arrow 5. This is accomplished by some pumping means 43, known to the arts, as represented by arrows 6 indicating exerted pressure on the surface of the electrolyte mixture 2. At a position along the said passageway 4, at a prescribed minimum distance from the electrolyte supply container 3 is provided an opening or small aperture 7 in the wall of the flow passageway tube 4. An active or sensing electrode probe unit 8 includes an electrode 9 of electrical conducting material such as platinum, stainless steel, etc., is shown sealed in an insulating envelope 10 which is a complete enclosure except for one small aperture 11. This aperture is placed in a position corresponding with the opening 7 in the flow passageway 4. The envelope 10 including its aperture 11 is filled with some ionic conducting medium 12. This may be a simple "salt bridge" made by sucking a melted gel powder, such as agar, which is saturated with KCl or $KNO_3$ solution, through the aperture 11 and then sealing the other end above the electrode 9 with a wax seal 13.

On the other hand, a non-polarizable (Cu—Cu—$SO_4$) electrode unit would work equally as well. The important thing is to have an apparent electrode of very small size which virtually acts as a real electrode of large area. A second companion electrode unit 14 which may be identical in construction and material as described for the working or velocity sensing unit 8 is provided. It may be considered as the passive or reference electrode unit and is placed opposite an opening 15 in the electrolyte container or reservoir 3 to allow passage of ions from this electrode to the electrolyte in the reservoir 3 where the flow rate Vo is minimal as represented by arrow 16.

The electrical system 17 includes a source of electrical energy 18 for imposing a fraction of a volt across the current-carrying electrodes units 8 and 14. This may be an alternating-current oscillator. The frequency required does not appear to be critical. A frequency of 2400 Hz. proved satisfactory. When so excited, under the prescribed conditions of this invention, the moving erythrocytes in the electrolyte emulsion act upon the current waveform so as to increase its strength or modulate the amplitude in proportion to the cube-root of the flow-rate of these blood red-cells in the immediate vicinity of the opening 7 in the flow tube 4. These modulations may then be monitored and the output presented in useful form by any of the several means known to the electronic arts. This electrical system 17 may include, the source of excitation 18 connected to the electrodes of units 8 and 14 by leads 20 and 19 respectively through a coupling network in the form, for example, of an electrical bridge, it may also include an amplitude modulation detector, all as represented in combination by unit 21. This unit 21 may operate into a recorder, galvanometer, on other output 22 directly, or a cubing unit 23 may be incorporated ahead of the amplifier to provide a linear output (see "Function Generator Derives Output Optically," Design News, Jan. 6, 1969, p. 30).

FIG. 2 shows an alternative electrode construction 14a which may be used to replace the passive electrode unit 14 with its ionic entrance to the electrolyte 11 in the container or reservoir 3. This is simply a metallic conductor electrode 9 of area equal to that of passive electrode unit 14 in contact with the electrolyte 2 with a lead 19 extending through the walls of the fluid source container 3. FIG. 3 illustrates an alternative modification 8a for the working or active sensing unit 8 which has a membrane film 24 interposed between the opening 11 in the envelope 10 and that of the electrolyte flow tube 7. This membrane may be a piece of cellophane dialysis sheeting which allows free transfer of ions to and from the electrode 9 and the electrolyte 2 but is impervious to blood.

The form of the invention FIG. 4, which is analogous to FIG. 1 in many respects, shows the application of these principles for use with living subjects, i.e., use in vivo. Here the fluid transport system becomes the sheathed vascular circulatory system of the body. This system is comprised of vessels made up of hollow tubes which may range from an inch in diameter for the large aorta to the microscopic capillaries. The transported fluid, naturally, is the blood in this case which is pumped through the system by the heart. ("In the circulatory system the total cross-sectional area gradually increases as we go from aorta to arteries to arterioles. At the point where arterioles break into a profusion of capillaries, the area suddenly increases tremendously, with a sudden marked slowing of the rate of flow. Correspondingly, as the capillaries join to form venules, or 'little veins' and these in turn unite into larger vessels, the total cross-sectional area diminishes, and the rate of flow increases again . . . . The speed of flow in the large veins almost attains that of the large arteries . . . .")

The sensing electrode unit or probe 26 is constructed much the same as that in FIG. 1 except that the tip is extended as shown at 27 like a hollow insulated needle with the ion conducting gel extending somewhat beyond the tip. The electrode unit tip is placed in contact with the skin directly over the vessel where the flow rate is to be measured. It will be noted that membrane 24 of the alternate electrode unit construction 8a of FIG. 3 is somewhat like skin tissues between the tip of the electrode unit and the vessel whose blood flow is to be measured. A passive electrode unit is shown in the form of a large area metal conducting plate 31. This corresponds with the passive electrode unit 14 which is shown as coacting with the slow moving electrolyte 2 in supply container 3 of FIG. 1. In FIG. 4 passive electrode 31 is mounted directly in contact with the skin over a capillary bed with an intervening conducting pathway to the body circulatory system, where velocity is minimal, at a considerable distance away from the active working or sensing electrode unit 26. For this purpose the passive electrode 31 may be placed against an ear lobe, finger, toe or heel. The electronic units 35 are the same as shown in FIG. 1 except for the addition, where required, of a divider for sensitivity or scale factor normalization circuit 36. In both cases the modulation detector may be in the form of a synchronous detector. A special application exists for this invention for determining the degree of gas saturation in the blood of deep-sea divers. For this purpose, this synchronous detector would be phased by 90° from non-reactive settings, since the peak cavitation effects have been found to lag the blood flow-rate effect of the erythrocytes by this angle.

FIG. 5 shows an alternative form 26a of sensing electrode unit 26 of FIG. 4. The envelope in this case is constructed from a flexible plastic composition with electrical insulating properties comprising the dome-shaped portion as shown 37, or equivalent form, for holding the metal electrode 9 and through which its lead 20 passes. Dome portion 37 is attached to a flat strip 38 of similar material, forming a complete enclosure for the electrode 9 except for a small opening 11 in the flat portion where the cavity is formed. This cavity 12 is filled with an ionic conducting gel, as before, extending through the hole 11. Straps 39 and 40, or other means, may be provided for use in fastening the unit 26a on some portion of the body to hold it firmly in position so that opening 11 is positioned over the vessel or vessels in question.

FIG. 6 shows a cross-sectional view of another alternative form of sensing electrode unit 26b. In this unit the ionic conducting bridge 41 between the electrode 9 and electrolyte through flesh 28 is partially unsupported and the insulating electrode holder 42 extends only part way down the ionic conducting bridge 41 which is self-supporting and may be arranged for movable extension. It may be formed from cellular material, a porous wick or stiff gel-like material.

This funnel shaped ionic conductor 41 concentrates the ions as they are transferred along its converging length and the boundry ionic conducting layer between its tip and the electrolyte. This boundry layer constitutes the vessel wall or the flesh immediately above it in vivo. In vitro use, FIG. 1, this boundry layer is the opening 7 in the insulating flow tube 4 which is plugged with the ionic conducting gel 12 or the film 24, of FIG. 3, each impervious to blood but free to conduct ions.

It was stated earlier in the specifications that the blood red-cell flow-rate, assuming laminar flow, amplitude modulates the electric current wave form, if alternating current, according to a precise cube-root law, provided however certain prescribed conditions are met. It is clear that these definite definable results are un-obvious merely from inspection of the method of construction of the system, as shown in FIG. 1, but must be defined otherwise in terms of specific relative dimension limitations. For a better understanding of these requirements refer to FIGS. 7 and 8 which should be considered together and compared.

FIG. 7 shows a conventionalized sketch representing the fluid transport system such as 1 in FIG. 1, flowing electrolyte 2 at velocity $V_0$ (16) and $V_1$ (5), the electrodes 14 and 8 for passive and sensing or active electrode, respectively, and a source 18 and sink or ground 43 for the electric-current circuit. Although alternating current is indicated, this does not rule out the use of direct current. FIG. 8 represents an idealized equivalent electrical circuit as applied to structure FIG. 7. The broken dividing lines $a$–$b$ and $a'b'$ separate the electro-chemically active portion, which occurs at the immediate interface of the metallic electrodes with the electrolyte boundary layers in both FIGS. 7 and 8. The capacitance marked $Cdb/2$ in FIG. 8 is correspondingly indicated in FIG. 7 by the dotted double lines (db) representing the conventionally understood Helmholtz double stationery-layers of ions which form, in effect, the action of an electrical capacitance. The impedance at each of these electrode boundry interfaces $Zdb/2$ combines the Faraday or electro-chemical impedance $Xf/2$ along with the reactance presented by the effective capacitance of the double-layer (db). The interelectrode resistance in the body of the electrolyte represented by R depends in part upon the dimensions of the fluid-flow transport system 1. The modulation of the current in the electrolyte of the container is represented by the very small variable resistance $\Delta r_0$ corresponding to the almost static flow-rate $V_0$ and the considerably larger variable resistance $\Delta r_1$ corresponding with the velocity $V_1$ in the passageway of the fluid transport system near the opening 7 opposite the sensing electrode unit aperture 11, or virtual electrode, as shown in FIG. 1. The amplitude modulation $\Delta r_1$ which increases with velocity, does so as a cube-root function attributable to the living, blood red-cells when in motion.

The problem is to provide a means for minimizing the "electrode" effects" relative to the flow effects due to the red-cell movement in the body of the electrolyte near the sensing electrode $\Delta r_1$ by employing a high impedance inter-electrode pathway relative to the impedance due to the electrode-effects $Zdb$ and minimizing $\Delta r_0$. This is accomplished if:

$$V_1 \gg V_0;\ R \gg Zdb,\ \text{where}\ R = f(\bar{l}/a)$$

and $$Zdb = fA$$

then $$(\Delta r_1)^3 \alpha V_1$$

Dimensionally speaking, this means that the electrodes should be of substantial area to provide a low current density at the applied potential. (Satisfactory operation at a minimum "real" electrode area of 3 sq. mm. with a fraction of a volt excitation between the electrodes was observed). The cross sectional area of the container should be at least 8 times that of the passageway or flow tube bore. A ratio of ($\bar{l}/a$) of 150 and over has been found acceptable.

Under these limitations an interelectrode impedance of 9000 ohms or over for whole-blood was found satisfactory and provides a criterion for spacing the electrodes in vivo, as shown in FIG. 4.

It is to be understood that flow-rate measurements may be made in large bore flow tubes or large blood vessels by inserting a metallic sensing electrode directly into the flow-tube in the region to be measured. The electrode would be in the form of a single electrode catheter for use in vivo. Comparable reduction of metal electrodes for small-bore flow tubes, such as required for the diagnostic instrument of FIG. 1 or small blood-vessels is mechanically feasible but electrically inoperative because of the high "electrode effect" impedances which result from the use of such micro-electrodes. It is therefore the special purpose of this invention to provide in cooperative combination with the other elements making up the working assembly the special electrode units such as shown in FIGS. 1, 3, 4, 5 and 6 which make possible high-impedance flow-rate measurements in the smaller flow tubes and blood vessels because the micro-ionic conducting aperture placed in or near the flow stream acts virtually as though it were a real electrode of large area and low impedance.

It should also be noted that without dimensional considerations the structure shown in FIG. 1 might pass for polarographic devices employed for chemical analysis. In such instruments one saturated or depolarized electrode acts as a reference or ½ cell of constant-potential, regardless of the magnitude of the current, while the compansion polarized ½ cell, which is usually placed in a moving stream of the electrolyte in question, is designed to accent rather than minimize the "electrode effect" which is the quantity, in the form of current vs. voltage relationship, be measured rather than the movement of the electrolyte. This movement is only incidental to the operation of the working micro-electrode or equivalent polarized probe employed. The electrodes are also closely spaced to minimize the impedance in the body of the electrolyte. In other words, diametrically opposite relative dimensional proportions than required by this invention, where a relatively high impedance is desired in the body of the electrolyte. The fact is, if two, rather than one references ½ cells were used, as here proposed as an alternative arrangement in this invention, no polarographic action could take place.

Some electrically operated blood red-cell counting devices also employ electrodes. Theese depend in principle upon the increase of resistance as the cells pass between a restricted passageway between the electrodes. This is due to the poor conductive properties of the red cells relative to their surrounding medium, in this case psychological normal saline. It is to be noted that in this invention the degree of response at a given-rate increases and the resistance decreases as the number of red-cells become more numerous.

It will be apparent that the embodiments shown are only exemplary and that various modifications can be made in construction and arrangement within the scope of invention as defined in the appended claims.

What is claimed is:

1. The combination with a fluid-transport system for an electrolyte with erythrocytes in colloidal suspension, including containing means for a source of said electrolyte mixture; means having at least one passageway for said electrolyte mixture connected to said containing means and having an opening permeable to ions leading to this one said passageway; means for moving the said electrolyte mixture from said source through this one said passageway and past said opening: an ionic transfer medium of convergent form having the point of convergence in registration with said opening; and electrode extending into said ionic-transfer medium forming a bridge between said electrode and said electrolyte mixture through said opening and point of convergence of said ionic transfer medium; second electrode means adapted to be ionically coupled to said fluid source; a source of electrical excitation between said electrodes; and means for modulating the electrical current in accordance with the cube-root of the velocity of flow of the said electrolyte mixture past said opening, said system comprising no part of a living body.

2. The invention as recited in claim 1 further including: an electrical bridge-network connected to said source of electrical excitation, said electrodes forming one arm of said bridge network; a demodulation amplifier connected to the output of said bridge network; a linearizing electrical cubing device connected to the output of said demodulation amplifier; a normalization circuit means including a divider circuit, the numerator input of said divider circuit connected to the output of said cubing circuit; an electrode carrier-current detector means; denominator input of said divider circuit connected to the output of said carrier-current detection means and output of said divider circuit operating into a utilization means.

3. The invention as set forth in claim 1 wherein said means for moving the said electrolyte mixture includes a constantly steady flow-rate controlled pumping means.

4. The invention as set forth in claim 1 wherein the total cross-sectional area of said containing means is at least eight times greater than the area of the said passageway; the effective area of each said electrode is at least 3 square millimeters; the ratio of the average length to cross-sectional area of the said passageway is more than 150; with said limitations the said electric current is modulated in amplitude proportional to the said cube-root function of the said electrolyte mixture velocity past said opening by said erythrocyte means.

5. The invention according to claim 1; wherein said ionic transfer medium is composed of a gelatinoid substance impregnated with an ion-conducting salt mixture; a flexible envelope of electrical insulating material enclosing said ionic transfer medium and said electrode except for an orifice at said point of ionic convergence.

References Cited
UNITED STATES PATENTS

| 3,151,052 | 9/1964 | Arthur et al. | 324—30 X |
| 3,242,729 | 3/1966 | Keller | 324—30 X |
| 3,529,591 | 9/1970 | Schuette | 128—2.05 F |

GERALD L. KAPLAN, Primary Examiner

U.S. Cl. X.R.

73—194 E, 194 F; 128—2.05 F; 204—1 T, 195 M; 324—29, 65 R

UNITED STATES PATENT OFFICE
CERTIFICATE OF CORRECTION

Patent No. 3,689,393   Dated September 5, 1972

Inventor(s) Merlin Davis

It is certified that error appears in the above-identified patent and that said Letters Patent are hereby corrected as shown below:

Column 1, line 31,   change "their" to --this--.

Column 2, line 11,   change "$(\Delta e)^3/\bar{I}$" to --$(\Delta e)^3/\bar{I}$,--, Column 3, line 11,   change "14" to --$\underline{14}$--.
         line 13,   change "8" to --$\underline{8}$--.
         line 20,   change "26" to --$\underline{26}$--.
         line 33,   change "1" to --$\underline{1}$--,
         line 42,   change "1" to --$\underline{1}$--.
         line 44,   change "1" to --$\underline{1}$--,
         line 55,   change "8" to --$\underline{8}$--,
         line 71,   change "14" to --$\underline{14}$--.
         line 73,   change "8" to --$\underline{8}$--.

Column 4, line 4,    change "17" to --$\underline{17}$--.
         line 6,    change "8" to --$\underline{8}$--.
         same line, change "14" to --$\underline{14}$--.
         line 18,   change "17" to --$\underline{17}$--,
         line 19,   change "8" to --$\underline{8}$--,
         same line, change "14" to --$\underline{14}$--,
         line 29,   change "14a" to --$\underline{14a}$--.
         line 31,   change "14" to --$\underline{14}$--.
         line 34,   change "14" to --$\underline{14}$--.
         line 36,   change "8a" to --$\underline{8a}$--.
         line 37,   change "8" to --$\underline{8}$--.
         line 63,   change "26" to --$\underline{26}$--.
         line 70,   change "8a" to --$\underline{8a}$--.
         line 75,   change "14" to --$\underline{14}$--.

UNITED STATES PATENT OFFICE
CERTIFICATE OF CORRECTION

Patent No. 3,689,393           Dated September 5, 1972

Inventor(s)   Merlin Davis

It is certified that error appears in the above-identified patent and that said Letters Patent are hereby corrected as shown below:

Column 5, line 6,        change "26" to --$\underline{26}$--.
          line 8,        change "35" to --$\underline{35}$--,
          line 19,       change "26a" to --$\underline{26a}$--.
          line 20,       change "26" to --$\underline{26}$--.
          line 31,       change "26a" to --$\underline{26a}$--.
          line 35,       change "26b" to --$\underline{26b}$--.
          line 65, after "as" change "1" to --$\underline{1}$--, heavy type
          line 66,       change "(16)" and "(5)"--to heavy type
          line 67,       change "14" and "8" to--$\underline{14}$ and $\underline{8}$, heavy type Column 6, line 12,       change "1" to--$\underline{1}$--.
          line 16,       put "7" in heavy type (after "opening")
          line 24,       after "electrode" delete the quotation mark (").

line 35,       change "$(Ar_1)^3 \propto V_1$ to--$(\Delta r_1)^3 \propto V_1$--
          line 43,       change "of" to--for--.
          lines 72-73,   correct the spelling of --companion--, Column 7,
          line 15,       change spelling of--These--.
          line 21,       after "given" insert --flow--.

Signed and sealed this 26th day of March 1974.

(SEAL)
Attest:

EDWARD M. FLETCHER, JR.  
Attesting Officer

C. MARSHALL DANN  
Commissioner of Patents